United States Patent [19]
Meyer

[11] 3,933,168
[45] Jan. 20, 1976

[54] LIQUID CLOSURE DEVICE

[75] Inventor: Georg Michael Meyer, Brookfield, Conn.

[73] Assignee: Georg Michael Meyer, Brookfield, Conn.

[22] Filed: Dec. 11, 1973

[21] Appl. No.: 423,668

[30] Foreign Application Priority Data
Dec. 13, 1972  Germany............................ 2260874

[52] U.S. Cl................................ 137/253; 137/590.5
[51] Int. Cl.² ........................................ F16L 9/00
[58] Field of Search ...... 137/251, 253, 625.43, 577, 137/590, 590.5, 247.49; 251/58

[56] References Cited
UNITED STATES PATENTS

| | | | |
|---|---|---|---|
| 927,794 | 7/1909 | Harvey............................ | 137/253 X |
| 2,388,890 | 11/1945 | Whitted......................... | 137/625.43 |
| 2,721,065 | 10/1955 | Ingram............................ | 137/253 X |
| 2,747,601 | 5/1956 | Quist................................... | 137/253 |
| 3,156,254 | 11/1964 | Stallkamp.......................... | 137/253 |
| 3,187,765 | 6/1965 | Frank................................ | 137/253 |
| 3,295,554 | 1/1967 | Huppert.......................... | 137/625.43 |
| 3,737,142 | 6/1973 | Boswell............................. | 251/58 |

Primary Examiner—Harold W. Weakley
Attorney, Agent, or Firm—Frank J. Jordan

[57] ABSTRACT

A liquid closure device for gas conduits includes a substantially vertically disposed gas inlet conduit extending into a container. A fluid inlet and fluid outlet having regulating valves are provided for the container. An efflux outlet means on the container includes a siphon with the arrangement being such that an orifice on the efflux outlet means is located above an orifice located at the lower end portion of the gas inlet conduit.

1 Claim, 4 Drawing Figures

LIQUID CLOSURE DEVICE

BACKGROUND OF THE INVENTION

This invention relates to a liquid closure device for gas conduits or pipes and which includes a container and a substantially vertical gas inlet pipe which projects at least with its lower orifice into the container.

When transporting gases in gas pipes very often the problem arises that the gas should pass or flow in one direction as unimpeded as possible whereas passage or flow in the other direction has to be absolutely prevented. Such a condition exists, for example, in gas pipes which connect a generator of inert gases (usually a combustion chamber) with an installation which uses inert gases (for example tanks for flammable liquids or explosive gases).

Liquid closure devices of this type have been described in the prior art publication "The Royal Institution of Naval Architects38 , WC (1971). In one well known arrangement, the orifices of the vertically positioned gas inlet pipe ends or extends below the water level of the container which is partially filled with water. During the normal functioning of the installation for the production of inert gases, that is where gas is transported from the generator to the installation which uses the inert gases, the inert gas must be pressed or passed through the water. For this purpose a considerable amount of energy is required which is proportional to the presssure drop of the gases which pass through. On the other hand, the gas absorbs a large amount of moisture while bubbling through the water and a large amount of this moisture has to be removed by the water separators which follow the liquid closure device. The passing of the gas through a water separator again causes a loss of pressure. Water will be pressed or passed into the vertically arranged inlet pipe if excessive pressure exists in the installation which uses the inert gas. The column of water which rises therein prevents the passage of gases into the gas generator. The height of the gas inlet pipe determines the maximum closure pressure.

In another known prior art arrangement according to Howden (see the publication quoted hereinabove) the inert gas passes through a Venturi tube after having passed through the container of the liquid closure device. The lower end of the vertically arranged gas inlet pipe is kept free of water during normal functioning of the inert gas generator by the pressure drop caused by this arrangement. Even this liquid closure device cannot operate without a considerable pressure drop, that is, a pressure drop in the Venturi tube.

Furthermore the gas is not entirely prevented from absorbing moisture. This is caused by the impinging and thereby redirecting of the inert gases upon the surface of the water which remained underneath the orifice of the gas inlet pipe. Furthermore the gas must penetrate the water in the charging and discharging phases when the water level is elevated. In these phases the takeup of moisture is particularly large.

Accordingly, an object of the present invention is to overcome the aforementioned disadvantages of known prior art arrangements and to provide a liquid closure device for gas conduits or pipes utilizing a container and a substantially vertically arranged inlet pipe which at least with its lower orifice projects into the container in such a way that a pressure drop does not occur any more, and that the absorption of moisture is prevented also during the charging and discharging phases.

According to the present invention the aforementioned objective is achieved by utilizing a container provided with regulating valves at the liquid inlet and at the liquid outlet, and also providing a fluid outlet containing a siphon with an outlet orifice on the fluid outlet being situated above the orifice on the gas inlet pipe. The container of the liquid closure device constructed in this manner may be kept empty during the whole normal working period so that the gases cannot absorb any moisture. No additional losses of pressure occurs within the liquid closure device besides the normal pressure drops normally associated with the passage of gas within a gas pipe.

The regulation of the valves for the inflow and for the outflow of liquids occurs preferably in such a way that one of both valves is closed when the other one is opened. When using such a regulation of the valves only one regulating means for both valves is needed, preferably a cylinder-piston arrangement.

It is also advantageous to provide a four-way valve instead of the two regulating valves. It is easy to fulfill the frequently needed requirement that the liquid flows constantly in the inflow pipe.

Other features which are considered characteristic of the invention are set forth in the appended claims.

Although the invention is illustrated and described in relationship to specific embodiments, it is nevertheless not intended to be limited to the details shown, since various modifications and structural changes may be made therein without department from the spirit of the invention and within the scope and range of equivalents of the claims.

SUMMARY OF THE INVENTION

A liquid closure device for gas conduits includes a substantially vertically disposed gas inlet conduit extending into a container. The gas inlet conduit has an orifice at a lower portion thereof. A fluid inlet and fluid outlet having regulation valves are also provided for the container. An efflux outlet means on the container is provided with a siphon and an orifice on the efflux outlet means is located above the orifice on the gas inlet means.

DESCRIPTION OF THE PREFERRED EMBODIMENTS

Figure 1:
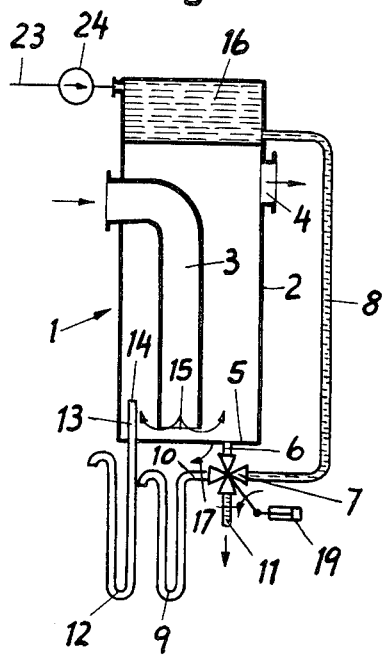
FIG. 1 is schematic elevational view of a liquid closure device with open circulation according to one embodiment of the invention and showing its functioning during normal operation.
Figure 2:
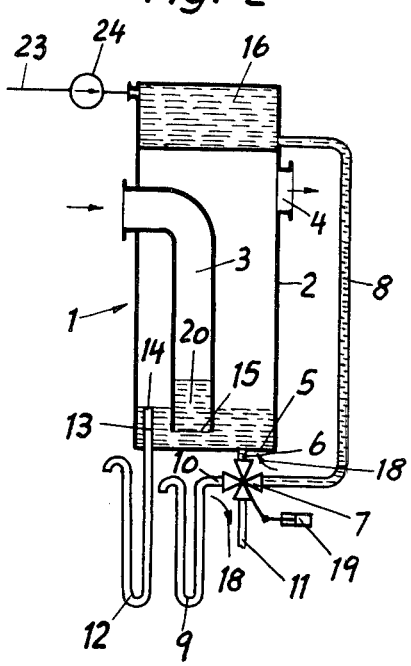
FIG. 2 is a view similar to FIG. 1 but showing the device when it is at rest.

Referring to the drawings there is shown a liuqid closure 1 which includes a container 2, a gas inlet 3, and an outlet junction 4 leading to the installation which uses the gas. A liquid outlet 6 is connected with a four-way valve 7 which is provided at the lowest point of the bottom 5 of the container 2. A conduit 8 for the introduction of fluid leads also into the four-way valve 7. Also connected to the four-way valve 7 is a pipe 10 which leads to a siphon 9 and an outlet pipe 11. The container 2 is provided with another outlet 13 which leads into a siphon 12 (FIGS. 1 and 2). An outlet aperture 14 of the outlet 13 is situated above an orifice 15 in the gas inlet conduit 3. Above the container 2 a liquid reservoir 16 is arranged with a liquid conduit 23 and a pump 24. The reservoir 16 is connected with the four-way valve 7 by the conduit 8.

FIG. 1 shows the normal functioning stage when the container 2 is completely empty so that the gas can pass through the container of the liquid closure device without an excessive pressure drop and without absorption of moisture. The four-way valve 7 is opened or conducts fluid as indicated by the arrows 17. Thus it will be seen in FIG. 1 that the liquid which runs constantly through the liquid reservoir 16 and the conduit 8 is removed through the outlet conduit 11. Siphons 9 and 12 close off the container 2 from atmospheric pressure. The container 2 under normal working conditions is at a slightly higher pressure than atmospheric.

When the generator of inert gases is at rest the four-way valve 7 is in the position as indicated by the arrows 18 in FIG. 2. As can be seen in this latter Figure the liquid in reservoir 16 flows into the container 2 and thereby shuts or closes off the orifice 15 in the gas inlet conduit pipe 3, the four-way valve 7 being switched from the FIG. 1 position to the FIG. 2 position by aid of a pneumatically operated cylinder-piston arrangement 19 which is regulated by a switching center.

The liquid which is constantly provided by the pipe 8 passes out through the outlet orifice 14 and out through the outlet 13. A column of liquid 20 rises in the gas inlet conduit 3 corresponding to the slight overpressure existing in the installation or apparatus of the users of inert gases (for example, tanks, cofferdams, and the like) because the generator is at normal pressure when the installation is at rest.

Figure 3:
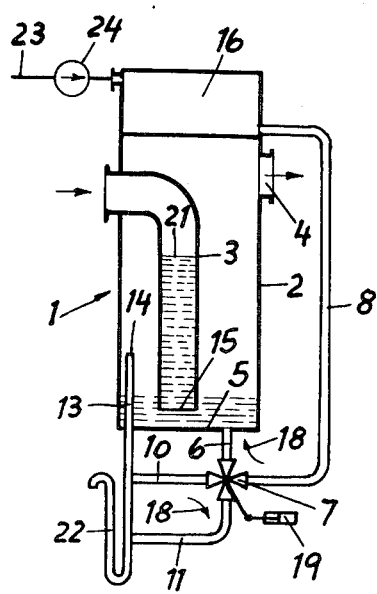
FIG. 3 is a view similar to FIGS. 1 and 2 showing the device when the installation which uses the gas is at an increased overpressure and also showing a modified arrangement of the siphons.

The installation which uses the inert gas is at increased overpressure at the stage illustrated in FIG. 3. In this latter FIG. the four-way valve 7 is positioned identically with its position at rest according to FIG. 2. A column of liquid 21 forms according to this overpressure in the gas inlet pipe 3, thereby preventing the flow of gases in the direction towards the generator of inert gases. The difference in height between the outlet orifice 14 of the outlet 13 and the orifice 15 of the gas inlet conduit 3 is chosen in such a way that the volume of liquid determined by these heights is at least identical, but preferably larger than the volume of the highest possible column of liquid in the pipe 3 which introduces the gases. Thus it is assured that the amount of fluid that is contained in container 2 while the installation is at rest suffices for the formation of the highest column. This is needed when suden overpressures occur in the using installation.

In FIG. 3 the outlet pipes 11 and 13 and also the pipe 10 lead into a common siphon 22 thereby providing an arrangement which simplifies the construction.

Figure 4:
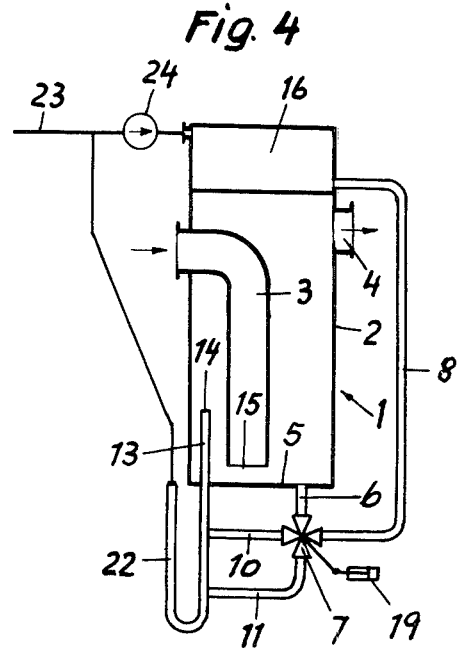
FIG. 4 is a schmetic elevational view of a modified liquid closure device having closed circulation and in which the siphon is connected to the feed pipe.

In FIG. 4 the siphon 22 is connected to the feed pipe 23, so that a closed liquid circuit results.

While the invention has been described by means of specific examples and in specific embodiments, it is not intended to be limited thereto, for obvious modifications will occur to those skilled in the art without departing from the spirit and scope of the invention.

What is claimed is:

1. A liquid closure device for an inert gas comprising an upright container, a gas inlet means for conducting gas to said container, a vertical gas inlet conduit joined to said gas inlet means, said vertical gas inlet conduit being vertically disposed within said container, said gas inlet conduit having means at its lower end portion defining a gas inlet orifice, a gas outlet on said container located at a higher elevation than said gas inlet orifice, a fluid inlet and a fluid outlet for said container, an efflux outlet means on said container and having an orifice disposed above the level of said gas inlet orifice, said vertical gas inlet conduit having a longitudinal length selected such that the internal volume of said gas inlet conduit is equal to or greater than the volume of said container between the level of said gas inlet orifice and the level of said efflux orifice, whereby liquid is precluded from flowing through said vertical gas inlet conduit to said gas inlet means as a result of a higher pressure in said container relative to said gas inlet means, a fluid reservoir disposed above said container and having a capacity to fill said container above the level of said gas inlet orifice, a fluid conduit leading from said reservoir to said fluid inlet, valve means in said fluid conduit for controlling the flow of fluid from said reservoir to said container, said valve being closed during normal operating conditions of the liquid closure device such that that said container is empty of fluid and said gas flows freely from said container gas inlet to said container gas outlet, said valve being opened when it is desired to effect a seal such that upon opening of said valve, fluid will flow by gravity from said reservoir to said container to a level above the level of said gas inlet orifice to thereby effect the seal by the gravity flow of said fluid and thereby preclude flow of gas from said container to said gas inlet conduit, water inlet means for said reservoir, said efflux outlet means comprising an efflux conduit connected to said water inlet means, and a pump in said water inlet means between said container and the connection between said efflux conduit and said water inlet means whereby there is provided a closed system in which said water is recirculated.

* * * * *